United States Patent
Raykhman et al.

(10) Patent No.: US 6,836,449 B2
(45) Date of Patent: Dec. 28, 2004

(54) ACOUSTIC METHOD AND DEVICE FOR DISTANCE MEASUREMENT

(75) Inventors: Alexander M. Raykhman, East Greenwich, RI (US); David I. Freger, Ashkelon (IL); Boris Sherman, Cranston, RI (US)

(73) Assignees: INESA East, Ltd., Ashkelon (IL); InESA, Inc., East Greenwich, RI (US)

( * ) Notice: Subject to any disclaimer, the term of this patent is extended or adjusted under 35 U.S.C. 154(b) by 0 days.

(21) Appl. No.: 10/656,655

(22) Filed: Sep. 5, 2003

(65) Prior Publication Data

US 2004/0081021 A1 Apr. 29, 2004

Related U.S. Application Data

(60) Provisional application No. 60/408,803, filed on Sep. 6, 2002.

(51) Int. Cl.$^7$ ................................................ G01S 15/00
(52) U.S. Cl. ........................................ 367/99; 367/902
(58) Field of Search .......................... 367/99, 118, 124, 367/127, 908, 902

(56) References Cited

U.S. PATENT DOCUMENTS

| | | | |
|---|---|---|---|
| 3,184,969 A | * 5/1965 | Bolton | 367/902 |
| 5,793,704 A | 8/1998 | Freger | 367/95 |
| 5,822,275 A | 10/1998 | Michalski | 367/99 |
| 5,867,125 A | 2/1999 | Cluff et al. | 342/442 |
| 5,877,997 A | 3/1999 | Fell | 367/99 |
| 6,040,898 A | 3/2000 | Mrosik et al. | 356/5.09 |
| 6,166,995 A | 12/2000 | Hoenes | 367/99 |

* cited by examiner

*Primary Examiner*—Daniel Pihulic
(74) *Attorney, Agent, or Firm*—McCormick, Paulding & Huber LLP

(57) ABSTRACT

An acoustic method for measuring of a distance between an emitter of acoustic energy and a target object provides for an accurate measurement by having the measurement's outcome invariant to the speed of sound variations along the acoustical path between the emitter and the target. A plurality of emitters and a plurality of receivers are used in the invention. One acoustic emitter and one receiver are located in a spatial region such that the sent and the reflected acoustical energy passes along substantially same vertical line between the emitter and the target. Another acoustic emitter sends the acoustical energy at an angled direction to the same area on the target's reflecting surface as the first emitter does. The corresponding echo travels to another receiver. During the measurement, two specific variables are being monitored such that possible variations of the speed of sound are irrelevant to the result of the distance measurement.

22 Claims, 3 Drawing Sheets

$v_h$ — electronic output, which is proportional to the sought distance h

ACOUSTIC METHOD AND DEVICE FOR DISTANCE MEASUREMENT

This application claims the benefit of and incorporates by reference essential subject matter disclosed in U.S. Provisional Patent Application No. 60/408,803 filed on Sep. 6, 2002.

FIELD OF THE INVENTION

The invention relates to an acoustical method and apparatus for distance measurement.

DESCRIPTION OF THE RELATED ART

A method for distance measurement that a developer employs in each distance measurement application could be based on the Pulse Transit Time (PTT) principal, as disclosed in U.S. Pat. Nos. 5,877,997, 5,822,275 and 5,793,704, or could be a continuous FMCW or Phase Shift or Amplitude Change monitoring methods or their multiple variations, as disclosed in U.S. Pat. Nos. 6,040,898 and 5,867,125. Regardless of the particular acoustical method for distance measurement, the transience of the speed of sound is always present and it always negatively affects the accuracy of measurement. For example, considering air, to be a transmitting medium in the acoustical measuring system, it is a known fact that the speed of sound depends on air pressure, air temperature and humidity along the path of the sound propagation, and the air along this path is not homogeneous, Meyers et al. Therefore, it could be a very complex task to equip an acoustical distance-measuring device with various sensors required for compensation of the mentioned above variables. Naturally, the need in effective compensation of the speed of sound changes during the acoustical distance measurement attracts attention of the acoustic measuring systems designers.

One solution was the direct measurement of the speed of sound and the consequent use of the result of this measurement in the distance-computing algorithm or the structure of the distance measuring analog and/or digital subsystem. Such approach is described in the U.S. Pat. No. 5,867,125 to Cliff et al. The Cliff patent recommended that if both, a transmitter and receiver are stationary, the system is capable of measuring changes in the propagation velocity of the transmission medium. This measurement could be used as a feedback to a system, allowing compensation for the changed propagation velocity. For example, this measurement could be used to adjust the oscillator of an ultrasonic range finding system so that the wavelength of the ultrasound does not vary with atmospheric changes."

Another solution suggested utilization of the natural properties of the measuring system itself for compensation of the speed of sound fluctuations. In such a case, the speed of sound compensating feedback could be found with the aid of selection of the specific fiducial points on the characteristic of the variable carrying information on the sought distance. An example of this approach is described in the U.S. Pat. No. 5,793,704, issued to Freger. In this work, the method of measurement was based on the Pulse Transit Time principle that requires sending pulse trains of acoustic energy toward a target, obtaining pulse trains reflected by the target, and calculating the sought distance as a function of the pulse travel time and the speed of sound. The author had discovered that any sensor used for the detection of the reflected pulses responded nonlinearly to the onset of acoustical energy. "These sensors are characterized by a response time that is shorter for high-energy signals than for low-energy signals." Furthermore, the patent stated that the energy level of the echo pulses propagating through the air tends to change inversely to the velocity of the sound propagation. Therefore, the author concluded that a range measurement based on selecting the maximum of the envelope of the received echo pulses is relatively immune to variations in the speed of sound.

The analysis of the former approach to compensation of the speed of sound variations during the acoustical distance measurement shows that this solution has a limited use due to the requirement that the only variable that may vary is the speed of sound; all other method's relating variables must be stationary in order to correctly measure the speed of sound changes. This condition leads a designer to the creation of a separate speed of sound measuring subsystem where the distance between the transducer and the target is known and stationary or the receiver serves as the target in a stationary arrangement with the known distance between the transmitter and the receiver, as well as the ambient air temperature, humidity, and the ambient air composition and dynamics. In some cases, the additional difficulty in the utilization of this method is conditioned by the inability for the distance measuring subsystem and the speed of sound measuring subsystem to operate in the same spatial field bringing inaccuracies to the outcome of the distance measurement.

The later solution to the reduction of the harmful effect of the speed of sound variations on the distance measurement does not provide for the total exclusion of the speed of sound from the measuring system equation. In the measuring systems designed on this principle, there are certain residual inaccuracies in the distance measurement that are attributable to the transience of the speed of sound.

Regardless of the acoustical method for distance measurement, some minimization of the speed of sound-caused disturbance (fast changes) could be achieved with the aid of signal filtering in echo processing. However, such improvement is obtainable at the expense of slowing the measuring system operating speed. Therefore, there is a need for an improved method and apparatus for measuring distances.

SUMMARY OF THE INVENTION

One object of the present invention is development of a method for distance measurement providing for the total exclusion of the speed of sound from the measuring system governing equation.

Another object of the present invention is to design a distance measuring apparatus implementing the method of measurement completely excluding the speed of sound from the factors affecting the accuracy of measurement.

According to the present invention, a method for distance measurement improves accuracy, resolution and operating speed of the acoustical distance measurement by means of complete exclusion of the speed of sound propagation in the measuring system's sound conducting medium from set of variables affecting the measurement. The method includes the steps of establishing two spatially different points from which a distance is measured or monitored by acoustical measuring devices between each said point and a center of a reflecting area on a target object such that a substantially perpendicular line could be drawn through said first point and said center of said reflecting area on said target, and an angled line could be drawn through said second point and said center of said reflecting area on said target, thereby these two lines and a line drawn through said two points define a right triangle denoted $\triangle ABC$ with its hypotenuse denoted CB between said second point and said center of said reflecting area of said target; measuring an approximate length of a vertical leg AB of said triangle; measuring an approximate length of said hypotenuse CB of said triangle; and obtaining a distance defined, between the said first point and said center of said reflecting area on said target through the application of the functional relationship between said distance and a ratio between the approximate length of said vertical leg AB of said triangle and the approximate length of said hypotenuse CB of said triangle, whereby said distance measurement is invariant to changes in the speed of sound propagation through the medium.

The implementation of the above identified method steps enables an acoustical measuring system to measure distance independent of the varying speed of sound propagation through the medium.

One embodiment of the present invention includes an installation of two assemblies of acoustical transmitting and receiving devices such that a first assembly sends and receives acoustic energy along a perpendicular axis to a reflecting area disposed on a target, and a second assembly sends and receives acoustical energy along an angled axis to the same reflecting area on the target. The direction of the sound propagation between the two assemblies and the target makes a substantially right triangle with its hypotenuse between an emitter of the second assembly's and an instant center of the target's reflecting area.

The method allows several embodiments. Particularly, for a PTT-based approach to distance measurement, the formula for the sought distance computation transforms into the following expression: $h=w \cdot tg[\arcsin(T_1/T_2)]$, wherein $T_1$ denotes the time that passes while the acoustic pulse train travels from the first assembly's emitter toward the target and back to the first assembly's receiver; $T_2$ denotes the time that passes while the acoustic pulse train travels from the second assembly's emitter toward the target and back to the second assembly's receiver. One possible positioning of the transmitter and the receiver of the second assembly is that the receiver and the transmitter are positioned at opposite sides from the first assembly transducer; the second assembly emitter and receiver and the first assembly transducer are located on the same plane or parallel planes, that are parallel to the target's reflecting area too. The embodiment also includes an Electronic Processing and Distance Computing Unit, ("Unit" hereafter). The output of the first assembly transducer is connected to the first input of the Unit. The output of the second assembly receiver is connected to the second input of the Unit, therefore, facilitating the ability of the electronic processing unit to process echo signals and to compute the sought distance between the first assembly transducer and the target and to display and/or to deliver the result of measurement to any accepting device or a user.

The foregoing and other advantages of the present invention become more apparent in light of the following detailed description of the exemplary embodiments thereof, as illustrated in the accompanying drawings.

DETAILED DESCRIPTION OF THE INVENTION

The purpose of the present invention is to improve accuracy and resolution and to increase operating speed of the distance acoustic measurement through application of such method of measurement that is invariant to possible changes of the speed of sound in operational space of an acoustic measuring device.

The method of the present invention does not depend on the type of acoustic signals traveling through the medium and the type of echo processing used for determination of specific variables that are proportional to certain distances to be measured or monitored according to the method. For the sake of simplicity of the detailed description of the invention, it is assumed that the distances are measured or monitored according to the Pulse Transit Time paradigm.

Figure 1:
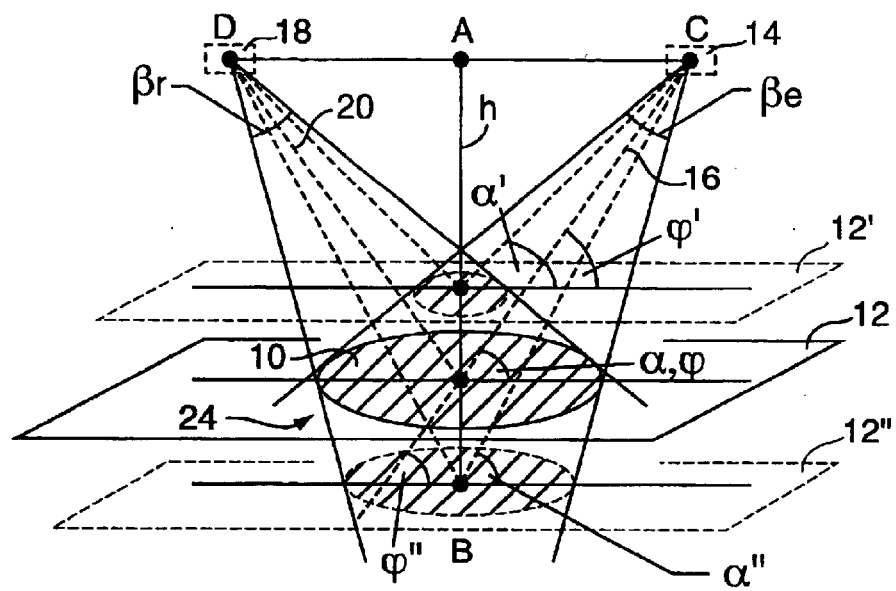
FIG. 1 is a schematic representation of a method of the distance measurement, in accordance with the present invention.

Referring to FIG. 1, a method of distance measurement sends acoustic pulses from at least two different spatial points toward the same reflecting area 10 on the target 12. FIG. 1 helps explaining the method of measurement depicting the minimal number of acoustic energy sources—two sources. According to FIG. 1, the acoustic pulses are generated at point A and directed at approximately 90° toward point B disposed on the target 12. The target reflects these pulses along the substantially same direct line AB. Other acoustic pulses are sent from point C toward the same point B on the target 12. A line CB forms an angle α with the reflecting area 10 on the target 12 having its center at the point B. The corresponding echo pulses are monitored at point D. A line BD forms the substantially same angle α with the reflecting area 10 on the target having its center at the point B. It is assumed by the method of measurement that the time needed for sending an acoustic pulse from the point A to the point B and for receiving the echo pulse back from the point B to the point A is measurable. It is also assumed by the method of measurement that the time needed for sending an acoustic pulse from the point C to the point B and for receiving the echo pulse from the point B to the point D is measurable too. It will be shown below that the sought distance $L_{AB} \equiv h$ is calculated by a function of the ratio between the times spent by the emitted acoustic pulses while reaching their points of monitoring, i.e., point A and point D, as best seen in FIG. 1. By doing so, the speed of sound is excluded from the process of distance measurement. In FIG. 1, point A and point B belong to the same direct line. The above described positioning of the points A and B is not critical for the method of the present invention. Such positioning in the FIG. 1 is used for the sake of simplification of the invention's description. Additionally, in the preferred embodiment, the reflecting area 10 is substantially flat.

The maximum of the acoustic streaming emitted by an acoustic emitter 14 from the point C is associated with a bisector 16 of the emitter directional diagram's spatial angle $\beta_e$. Consequently, the maximum of the acoustic streaming taken by an acoustic receiver 18 at the point D is associated with a bisector 20 of the receiver directional diagram's spatial angle $\beta_r$. Having intersected on the target's surface, these two directional diagrams create an ellipse 24 with its central point B being located on the line AB. A spatial region where the bisectors 16, 20 of the directional diagrams observed from the point C and the point D determines the center of a measuring range according to the method of the present invention. When the reflecting area 10 on the target 12 moves away from the central position, the gradients of the sent and received acoustical energy, the reflecting ellipsoidal area and the length of the line CB between the acoustic emitter and the center of the ellipse depend on the angle $\alpha$ that in its own turn depends on the sought distance h between the points A and B, as shown in FIG. 1. The moving targets 12', 12" are shown in FIG. 1 by dashed lines. The implementation of the method requires minimal computational correction if $$DA = CA, \quad (1)$$

$$\beta_e = \beta_r \quad (2)$$

Figure 2:
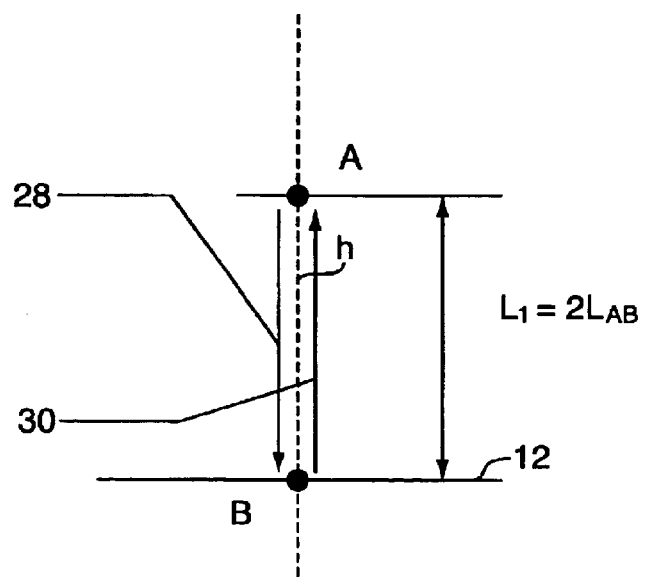
FIG. 2 is a schematic representation of a transducer sending acoustic pulses toward a target and receiving acoustic pulses that the target reflects along the same direct line between the transducer and an object of FIG. 1.

Referring to FIG. 2, an acoustic pulse travels from the point A to the point B, as indicated by an arrow 28, gets reflected by the target as indicated by an arrow 30, and then returns to the same point A. Hence, this pulse passes a distance $L_1$:

$$L_1 \cong 2L_{AB} = c \cdot T_1, \quad (3)$$

wherein $L_{AB}$—distance between the point A and the point B; $T_1$—time needed for the acoustic pulse to travel from the point A to the point B and to return back from the point B to the point A; c—speed of sound, which is variable.

Figure 3:
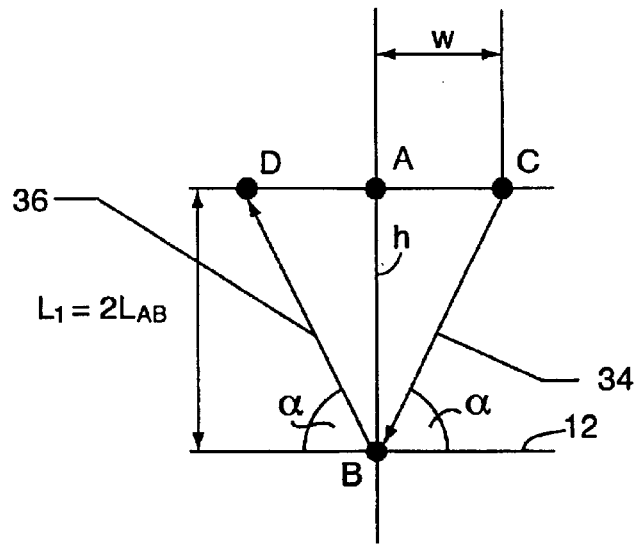
FIG. 3 is a schematic representation of an acoustic emitter sending acoustic pulses toward the target at an angle α to the target's flat reflecting surface and another acoustic receiver taking the acoustic pulses reflected by the target at the angle a as shown in FIG. 1.

Referring to FIG. 3, an acoustic pulse emitted from the point C, denoted by an arrow 34 travels a distance $L_2$:

$$L_2 \cong 2L_{AB}/\sin \alpha = c \cdot T_2, \quad (4)$$

wherein $L_{AB}$—distance between the point A and the point B; $T_2$—time needed for the acoustic pulse to travel from the point C to the point B and continue traveling from the point B to the point D as denoted by an arrow 36; c—speed of sound, variable.

Also, referring to FIG. 1 and FIG. 3, the exact length h of the leg AB:

$$h = w \cdot tg\alpha \quad (5)$$

$$\alpha = \arcsin(L_1/L_2) = \arcsin(T_1/T_2) \quad (6)$$

Therefore, $$h = w \cdot tg[\arcsin(T_1/T_2)] \quad (7)$$

In (5), $w = L_{AC}$ is a predetermined known length of the leg AC of a right triangle $\triangle ABC$ with its hypotenuse CB.

According to (7), the result of the sought distance h measurement cannot be affected by possible variations of the speed of sound.

Granting (1) and (2), the described above method is realizable if $$\alpha = \alpha(h) \quad (8)$$

$$w = \text{const}, \beta_e = \beta_r = \beta \quad (9)$$

The conditions (8), (9) present a constraint that defines the measurable range for the sought distance h:

$$h_{min} = w \cdot tg(\phi - 0.5\beta) \quad (10)$$

$$h_{max} = w \cdot tg(\phi + 0.5\beta) \quad (11)$$

wherein $\phi$ denotes an angle between the bisector 16 of the directional diagram spatial angle $\beta$ and the target's reflecting area 10. In the discussed embodiment, $\phi = \phi_e = \phi_r = \text{const}$.

Figure 4:
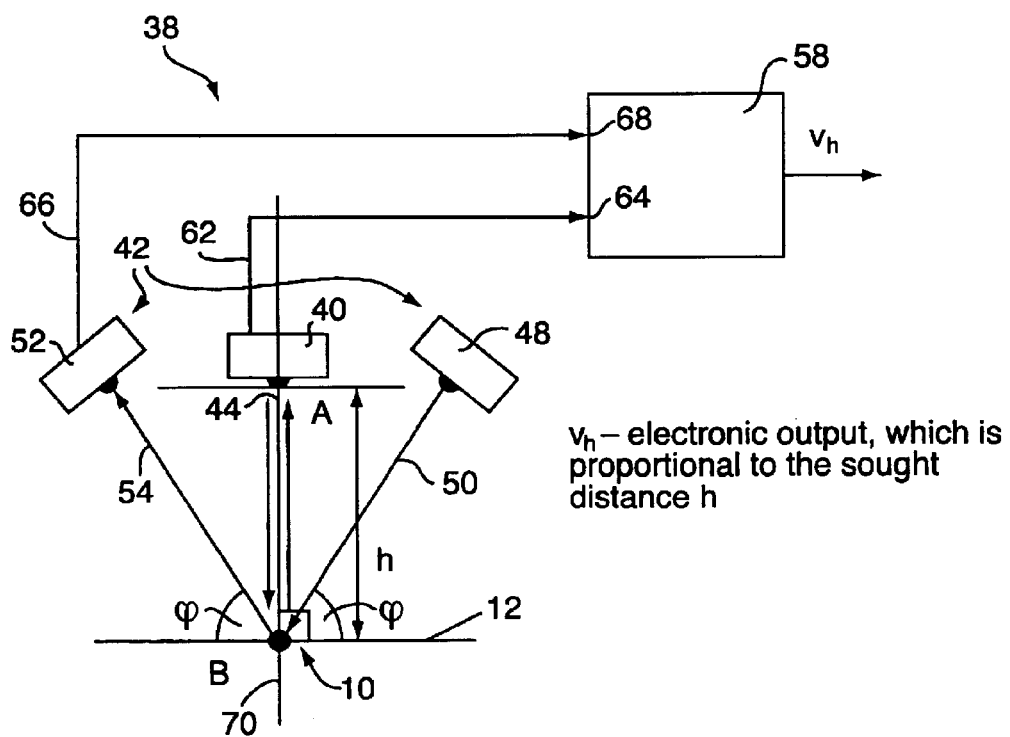
FIG. 4 is a functional block-diagram of an acoustic measuring device in accordance with the present invention.

One possible, but not limited to it, method's embodiment is a measuring device 38, having a block-diagram shown in the FIG. 4. The device 38 includes a first distance measuring assembly 40 and a second distance measuring assembly 42.

In the preferred embodiment, the first distance measuring assembly 40 is a transducer. Transducer's directional diagram bisector 44 makes a substantially right angle with the target's reflecting area 10.

The second distance measuring assembly 42 includes an emitter 46 having a directional diagram bisector 50 making an angle $\phi < 90°$ with the target's reflecting area 10 and a receiver 52 having a directional diagram bisector 54 making an angle $\phi < 90°$ with the target's reflecting area 10.

In a preferred embodiment, means for calculation of distance 58 is an Electronic Processing and Distance Computing Unit 58 that processes data from the transducer 40, and the receiver 52, calculates sought distance between the transducer 40 and the target 12, and displays and/or delivers the result of measurement to any accepting device or a user.

The output 62 of the transducer 40 is connected to a first input 64 of the unit 58 and the output 66 of the receiver 52 is connected to a second input 68 of the unit 58, therefore facilitating the ability of the electronic processing unit 58 to process the source data and to compute the sought distance h between the transducer 40 and the target 12.

Emitter 48 and receiver 52 make a substantially symmetrical figure with an axis of symmetry 70 passing through the transducer 40 at a substantially right angle to the target's reflecting area 10 and between the emitter 48 and the receiver 52. The transducer 40 emits acoustic pulses toward the target and receives the pulses reflected by the target. The emitter 48 sends acoustic pulses toward the target at angled direction. This makes possible for the receiver 52 to get the acoustic pulses reflected by the target. The electronic processing unit 58 measures the acoustic pulses' traveling time $T_1$ covering the double distance between the transducer 40 and the target 12. At the same time, the unit 58 measures the acoustic pulses' traveling time $T_2$ covering the distance between the emitter 48 and the receiver 52. Then, the unit 58 calculates the sought distance h according to the formula (7). In this connection, the distance measurement is being performed independently of possible variations of the speed of sound in the operational space of the measuring device.

Figure 5:
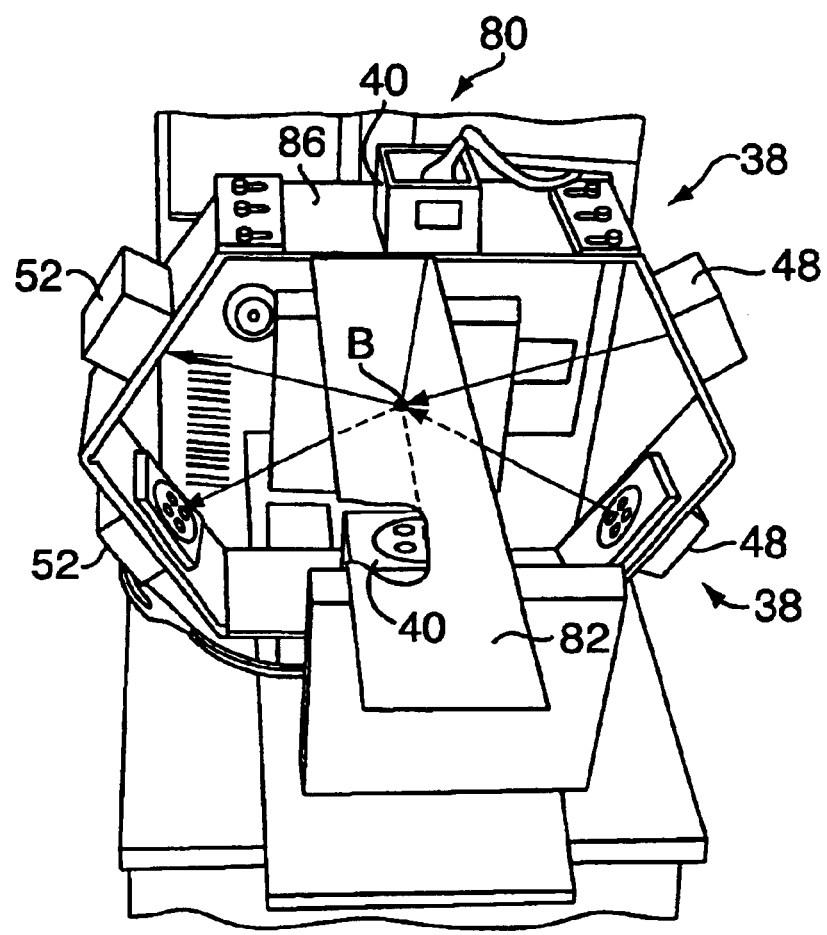
FIG. 5 is a schematic representation of an application of the present invention as a thickness measuring gauge intended for use in control loops of flat material manufacturing processes.

Referring to FIG. 5, one important application of the present invention is a thickness measuring gauge 80 for substantially flat moving materials 82 (Gauge). This application is an obvious demonstration of the advantage and utility of the present invention. The experimental working prototype of the Gauge 80 is shown in the FIG. 5. In general, the Gauge is designed as a combination of two measuring distance devices 38 similar to the above described embodiment of the present invention. Both devices 38 are mounted on the frame coaxially such that the acoustic beams from both transducers 40 aim at the same point from the both sides of the moving flat target 82. The thickness of the moving flat material is calculated through the application of the delta math as follows:

$$\theta = D - (d_1 + d_2), D = \text{const} \quad (12)$$

wherein, $\theta$—thickness of the material 82; D—measuring frame base or constant distance between transducers 40; $d_1$, $d_2$—distance between the one end of the measuring base (or a transducer 40) to the one side of the material 82 and between the opposite end of the measuring base (or the other transducer 40) to the opposite side of the material, respectively. The distances $d_1$ and $d_2$ are computed according to the formula (7), and therefore, are invariant to fluctuations of the speed of sound in the operational space of the measuring devices. The described above Gauge-type is used in control systems or serves as an indicator for a flat material manufacturing processes such as cold rolling mills for metals production, and paper or plastic film or web manufacturing. The environment for these manufacturing processes abounds with air-oil mist, water vapor, and temperature fluctuations. During measurement, all listed above factors forward to continuous random changes in the speed of sound. Various methods of signal filtering are used in measuring devices for the elimination of the speed of sound transience. Application of such filters causes reduction in the measuring device's processing time, and therefore, impairs accuracy of the instantaneous thickness measurement for materials with frequent thickness variations. The present invention essentially eases technical requirements to filtering stages of the signal processing devices because the invented method of distance measurement is invariant to fluctuations of the speed of sound.

While the present invention has been illustrated and described with respect to a particular embodiment thereof, it should be appreciated by those of ordinary skill in the art, that various modifications to this invention may be made without departing from the spirit and scope of the present invention.

What is claimed is:

1. A method for distance measurement comprising the steps of:

establishing two spatially different points from which a distance is measured or monitored by acoustical measuring devices between each said point and a center of a reflecting area on a target object such that a substantially perpendicular line could be drawn through said first point and said center of said reflecting area on said target, and an angled line could be drawn through said second point and said center of said reflecting area on said target, thereby these two lines and a line drawn through said two points define a right triangle denoted ΔABC with its hypotenuse denoted CB between said second point and said center of said reflecting area of said target;

measuring an approximate length of a vertical leg AB of said triangle;

measuring an approximate length of said hypotenuse CB of said triangle; and obtaining a distance defined, between the said first point and said center of said reflecting area on said target through the application of the functional relationship between said distance and a ratio between the approximate length of said vertical leg AB of said triangle and the approximate length of said hypotenuse CB of said triangle, whereby said distance measurement is invariant to changes in the speed of sound propagation through the medium.

2. The method according to claim 1 further including the steps of:

obtaining said distance by implementing a computation of the following formula: $h = w \cdot tg[\arcsin(L_{AB}/L_{CB})]$, wherein w represents the known distance between the vertical leg AB and said second point, and $L_{AB}$ denotes measured length of said vertical leg AB of said triangle ΔABC, and $L_{CB}$ denotes measured length of said hypotenuse CB of said triangle ΔABC, and h represents the distance.

3. The method according to claim 2 wherein in Pulse Transit Time-based methods of echo processing in acoustical measuring systems, said formula for the determination of said distance h may have the following mathematical description: $h = w \cdot tg[\arcsin(T_1/T_2)]$, wherein $T_1$ denotes the time that passes while an acoustic pulse train travels from an emitter located at said first point toward the target and back to a receiver located at said first point, and $T_2$ denotes the time that passes while the acoustic pulse train travels from an emitter located at said second point toward the target and then continue to a receiver associated with said second point.

4. The method according to claim 1 wherein said approach to the exclusion of the speed of sound variable from the outcome of said distance measurement does not depend on a type of acoustical signals traveling through the medium and on a type of echo processing used for the monitoring of variables that are proportional to length of said leg AB and length of said hypotenuse CB of said triangle ΔABC.

5. The method according to claim 1 wherein any method for acoustical echo processing including but not limited to known Pulse Transit Time, FMCW, Phase Shift or Amplitude Change-based methods and their variations are applicable for the monitoring of said $L_{AB}$ and $L_{CB}$ variables.

6. The method according to claim 5 wherein selection of said method for echo processing is determined by a specification of a technical project said method is applied for.

7. The method according to claim 1 wherein said approximate length of said vertical leg AB and said approximate length of said hypotenuse CB are approximate due to variations in the speed of sound.

8. The method according to claim 1 wherein said target is moving.

9. The method according to claim 1 wherein said target is substantially stationary.

10. The method according to claim 1 wherein said method is used for the distance measurement from both sides of said target object.

11. The method according to claim 10 wherein thickness of said target object is calculated by application of a delta math paradigm such that $\theta = D - (d_1 + d_2)$, wherein θ denotes thickness of said target object, D denotes a predetermined constant base distance between emitters at said first points situated coaxially from both sides of said target object, $d_1$ denotes distance between one said first point and one side of said target object, and $d_2$ denotes distance between another first point and the opposite side of said target object.

12. The method according to claim 11 further including a step of:

calculating said distances $d_1$ and $d_2$ according to the formula:

$\forall j=1,2 \rightarrow d_j = w_j \cdot tg[\arcsin(L_{AB,j}/L_{CB,j})]$ wherein j denotes the side of said target object from which the distance is being measured, and $w_j$ denotes a predetermined known length of the leg $AC_j$ of said triangle $\Delta ABC_j$ established at j-th site of said target object, and $L_{AB,j}$ denotes an approximate length of the leg $AB_j$ of said triangle $\Delta ABC_j$ and $L_{CB,j}$ denotes an approximate length of the hypotenuse $CB_j$ of said triangle $\Delta ABC_j$.

13. The method according to claim 1 wherein said target object is flat.

14. The method according to claim 13 wherein said approximate length of said vertical leg AB and said approximate length of said hypotenuse CB are approximate due to variations in the speed of sound.

15. An apparatus for distance measurement comprising:

a first distance measuring assembly having a first emitter of acoustic energy and a first receiver of acoustic energy located in substantially same spatial region with defining a first point;

a second distance measuring assembly having a second emitter of acoustic energy located in a second spatial region defining a second point and having a second receiver of acoustic energy substantially symmetrically associated with said second point; and means for calculation of a distance between said first point and an instant center of a reflecting area on a target object.

16. The apparatus according to claim 15 wherein:

said first assembly sends and receives signals along a perpendicular axis to said reflecting area on said target; and said second assembly sends and receives signals along an angled axis to said reflecting area on said target, whereby the direction of said first assembly's gradient of emitted acoustical energy and the direction of said second assembly's gradient of emitted acoustical energy and a line drawn through said first point and said second point create a right triangle denoted $\Delta ABC$ with its hypotenuse denoted CB between the second assembly's emitter and the instant center of the target's reflecting area; and a vertex A of said triangle $\Delta ABC$ is a projection of said second point onto said line AB; and said second point is a vertex B of said triangle $\Delta ABC$; and the output of said first assembly's receiver is connected to a first input of said means for precise distance calculation; and the output of said second assembly's receiver is connected to a second input of said means for precise distance calculation, thereby facilitating the ability of said means for precise distance calculating to process data from both said measuring assemblies and to calculate said sought distance; and the output of said means for precise distance calculation is connected to an input of said means for delivering said distance measurement outcome to an accepting device or a user.

17. The apparatus according to claim 15 wherein:

said first assembly measures an approximate length of the vertical leg of said triangle denoted $L_{AB}$ and sends its measurement to said means for calculating said sought distance h;

said second assembly measures an approximate length of the hypotenuse CB of the triangle denoted $L_{CB}$ and sends its measurement to said means for calculating said sought distance h; and said means for calculating a precise value of said distance h through the application of the functional relationship between the sought distance h and the ratio $L_{AB}/L_{CB}$, whereby improving the accuracy, resolution and operating speed of said sought distance h measurement due to the invariance of the measurement outcome to changes in the speed of sound propagation through the medium.

18. The apparatus according to claim 15 wherein:

said means for calculation is a computing device programmed to numerically calculate said sought distance.

19. The apparatus according to claim 15 wherein said means for distance-calculation is an electronic digital and/or analog device which structural organization allows generation of an electronic signal proportional to said sought distance.

20. The apparatus according to claim 15 further including:

in thickness measurement applications for a flat material, moving or immobile, a thickness-measuring gauge is comprised of two said distance measuring apparatus, with one said apparatus mounted on a frame above the material and another said apparatus mounted on the same frame underneath the material; and both said apparatus are situated coaxially such that the acoustic beams from both apparatus aim at the same point from the both sides of said material.

21. The apparatus according to claim 20 wherein:

the thickness of said flat material is calculated by application of a delta math paradigm such that $\theta = D - (d_1 + d_2)$ wherein $\theta$ denotes thickness of said material, and D denotes a predetermined constant base distance between two opposing each other points on said frame and $d_1$ denotes said measured by said first apparatus precise distance between said opposing point on the frame and one side of said flat material, and $d_2$ denotes said measured by said second apparatus precise distance between another said opposing point and the opposite side of said flat material, whereby providing for improvement in said thickness measurement accuracy, resolution and operating speed due to the exclusion of the speed of sound variable from the acoustical process of distance measurement.

22. The apparatus according to claim 15 further comprises:

means for delivering said distance measurement outcome to an accepting device or a user.

* * * * *